United States Patent [19]

Almasy

[11] 4,101,002

[45] Jul. 18, 1978

[54] TRACK MOUNTED LUBRICATION APPARATUS

[76] Inventor: Ernest W. Almasy, 2416 Second St., Westland, Mich. 48184

[21] Appl. No.: 788,297

[22] Filed: Apr. 18, 1977

[51] Int. Cl.² .................. F16N 7/24; F16N 11/10
[52] U.S. Cl. .................... 184/15 B; 184/3 R; 184/29
[58] Field of Search ............ 184/15 A, 15 B, 15 R, 184/3 A, 3 R, 7 R, 29, 36, 54, 101

[56] References Cited

U.S. PATENT DOCUMENTS

| | | | |
|---|---|---|---|
| 1,228,335 | 5/1917 | McClelland | 184/29 |
| 2,022,726 | 12/1935 | Leach | 184/15 B |
| 2,664,969 | 1/1954 | Bjerre | 184/15 B |
| 2,848,068 | 8/1958 | Abbott et al. | 184/15 A |
| 2,893,515 | 7/1959 | Schweisthal | 184/15 A |
| 3,599,753 | 8/1971 | Walsh | 184/15 A |

FOREIGN PATENT DOCUMENTS 1,098,592  3/1955  France .................. 184/15 B

*Primary Examiner*—David H. Brown
*Attorney, Agent, or Firm*—Charles W. Chandler

[57] ABSTRACT

Apparatus for lubricating a pair of conveyor wheels rolling along opposite sides of an I-beam. The wheels squeeze a bellows disposed in a web opening to deliver a lubricant to the conveyor wheels as the volume of the bellows is reduced.

6 Claims, 4 Drawing Figures

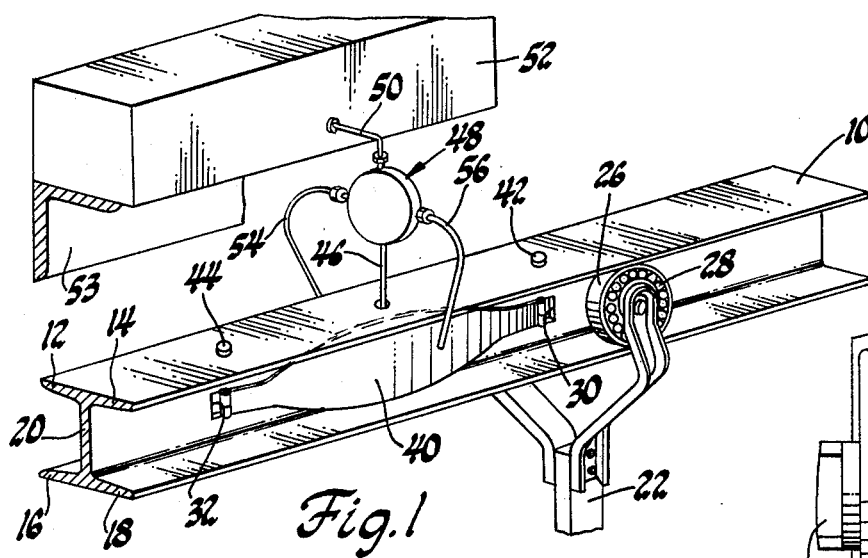
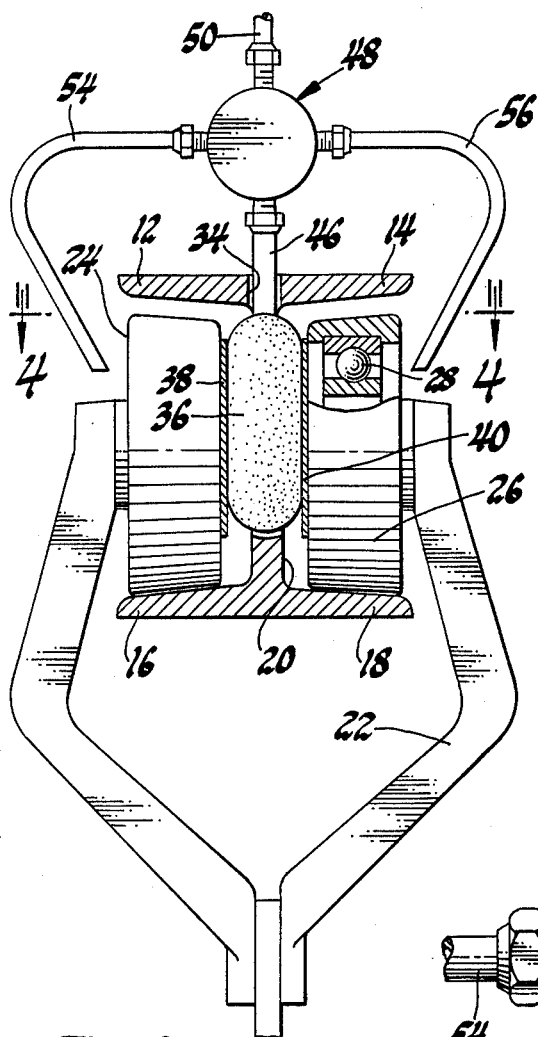
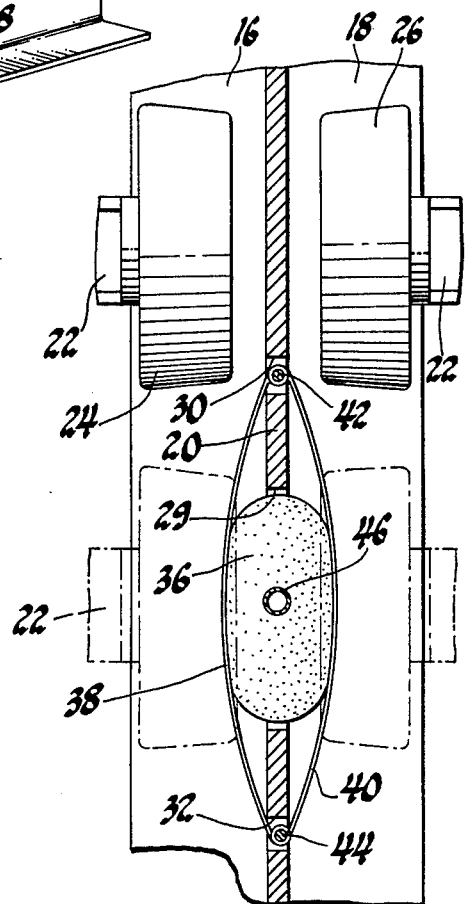
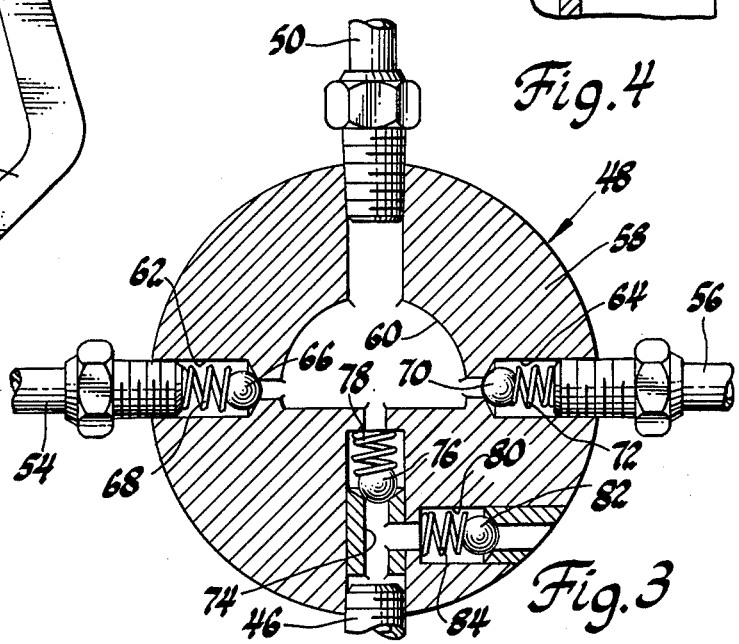
Fig.1
Fig.2
Fig.3
Fig.4

4,101,002

TRACK MOUNTED LUBRICATION APPARATUS

BACKGROUND OF THE INVENTION

This invention relates to means for lubricating conveyor wheels rolling along the lower flanges of an I-beam while the wheels are in motion, and more particularly to such a system in which the wheels are lubricated as they engage a bellows-operated lubricating device between them.

Many industrial applications employ a conveyor system in which wheel-mounted hangers move along an I-beam. It is necessary to frequently lubricate the wheel bearings without interfering with the conveyor motion. A variety of lubrication systems have been developed for such conveyors such as those disclosed in U.S. Pat. Nos. 2,848,068 and 3,599,753. Such prior art systems employ a relatively expensive, complicated mechanical device for sensing whe wheels as they pass a predetermined position, and then delivering an appropriate amount of lubricant to the conveyor wheels.

SUMMARY OF THE INVENTION

The broad purpose of the present invention is to provide an improved system for lubricating conveyor wheels rolling along the lower flanges of an I-beam by disposing a bellows-operated lubricating device in a web opening in the path of motion of the wheels.

Still further objects and advantages of the invention will become readily apparent to those skilled in the art to which the invention pertains upon reference to the following detailed description.

DESCRIPTION OF THE DRAWING

The description refers to the accompanying drawing in which like reference characters refer to like parts throughout the several views, and in which:

FIG. 1 is a perspective view illustrating a lubricating system illustrating the preferred embodiment of the invention;

FIG. 2 is a view through the bellows of FIG. 1 as viewed in a plane transverse to the path of motion of the conveyor wheels;

FIG. 3 is an enlarged view of the valve employed in the lubricating system; and

FIG. 4 is a view taken along lines 4—4 of FIG. 2.

DESCRIPTION OF THE PREFERRED EMBODIMENT

Referring to the drawing, FIG. 1 illustrates an I-beam 10 having a pair of upper flanges 12 and 14, a pair of lower flanges 16 and 18, and an intermediate web 20.

Conveyor apparatus, indicated as 22, is supported by a pair of conveyor wheels 24 and 26, mounted on lower flanges 16 and 18, respectively, on opposite sides of web 20. Each conveyor wheel has exposed wheel bearings 28, only those on wheel 26 being illustrated.

Web 20 has an opening 29 adjacent the upper I-beam flanges, and a pair of smaller openings 30 and 32 on opposite sides of opening 29. Opening 29 is preferably formed in a section of I-beam 10 in which the conveyor is moved in an unloaded condition. The I-beam also has a vertical opening 34 extending from opening 29 and between upper flanges 12 and 14, as is best illustrated in FIG. 2.

Referring to FIGS. 2 and 4, a resilient, expandible bellows 36 is disposed in opening 29. Bellows 36 is formed of a resilient, flexible material such that it can be compressed between wheels 24 and 26 from a greater volume to a lesser volume, as is illustrated in phantom in FIG. 4.

A pair of resilient elongated guides 38 and 40 are mounted on opposite sides of bellows 36. The ends of guides 38 and 40 are joined together by pins 42 and 44 respectively. The arrangement is such that as wheels 24 and 26 approach the bellows, they engage the two guides and then slide along the guides to gradually reduce the volume of the bellows. It is to be noted that the guides are so formed as to engage the wheels and compress the bellows regardless of which direction the wheels are moved toward the bellows.

Referring to FIGS. 1 and 2, a conduit 46, disposed in opening 34, connects the bellows to valve means 48. Another conduit 50 connects valve means 48 to lubricant reservoir 52 mounted on a support 53 adjacent I-beam 10. A pair of nozzles 54 and 56 are mounted on opposite sides of valve means 48 with lower outlet openings disposed closely adjacent the path of motion of the wheel bearings.

Referring to FIG. 3, valve means 48 comprises a body 58 having an internal chamber 60 for receiving lubricant from reservoir 52 by gravity through conduit 50. Body 58 has a conduit 62 on one side and a second outlet conduit 64 on its opposite side for connecting chamber 60 to nozzles 54 and 56, respectively. Ball 66, biased by a spring 68, is mounted in conduit passage 62 and a ball 70, biased by a spring 72, is disposed in conduit 64. Body 58 has a passage 74 for fluidly connecting chamber 60 to conduit 46. A ball 76, biased by a spring 78 is disposed in passage 74 for movement between an open position and a closed position. An air vent passage 80 connects passage 74 to the atmosphere. A ball 82 is disposed in passage 80, and biased by a spring 84 toward a closed position.

In operation, bellows 36 is normally filled with air. As it is compressed by wheels 24 and 26 so that its internal volume is reduced, the air pressure in the bellows and in passage 74 increases to move ball 76 to its open position. The compressed air then forces lubricant and air through outlet passages 62 and 64 by creating a pressure differential that moves balls 66 and 70 to their open position. A combination of air and lubricant then passes through the lower outlet end of nozzles 54 and 56 to produce a mist that is delivered to the bearings carried by each of the wheels 24 and 26. When the wheels have passed bellows 36, the bellows resiliency causes it to expand to its greater volume. The reduced pressure in chamber 60 then permits balls 66 and 70 to be moved to their closed positions, by springs 68 and 72. The reduced pressure also causes ball 76 to be moved to its closed position. As the bellows continues to expand, the reduced air pressure in passage 74 causes valve 82 to move to its open position to admit air into passage 74 and to bellows 36.

Thus it can be seen that I have described in detail a lubricating system that delivers lubricant to moving wheel bearings in response to a bellows being compressed by the moving wheels. The preferred apparatus requires no pneumatic or electrical connections since it operates in response to the motion of the conveyor wheels.

Having described my invention, I claim:

1. A combination comprising:
    an I-beam having a pair of upper flanges, a pair of lower flanges and a web between said flanges;

a pair of conveyor wheels supported on the lower flanges on opposite sides of the web so as to be movable along a path of motion, said conveyor wheels having bearings;

lubrication means mounted adjacent the I-beam including a lubricant reservoir;

nozzle means connected to the lubricant reservoir and operative to deliver lubricant therefrom to a position adjacent the path of motion of the conveyor wheels;

resilient bellows means disposed adjacent said web means and the path of motion of the conveyor wheels such that the volume of the bellows is reduced as the wheels pass the bellows, and means connecting the bellows means to the lubrication means, whereby lubricant is delivered to the wheel bearings as the volume of the bellows means is being reduced.

2. A combination as defined in claim 1, in which the bellows means is mounted so as to be disposed between the conveyor wheels as the lubricant is being delivered to said bearings.

3. A combination as defined in claim 1, in which the connecting means includes a conduit connecting the bellows means to the nozzle means.

4. A combination as defined in claim 1, in which the bellows means is expandable from a lesser volume to a greater volume and in which the connecting means includes a conduit connecting the bellows means to the nozzle means, and means for introducing air into the bellows means as it is being expanded from said lesser volume to said greater volume, the bellows means being so connected to the nozzle means as to deliver said air with lubricant to the wheel bearings as the bellows means is being engaged by the conveyor wheels.

5. A combination as defined in claim 1, in which the conveyor wheels are movable along the lower flanges in either a first direction, or in the opposite, second direction, and the bellows means are operable to deliver lubricant to the bearings in response to the conveyor wheels engaging the bellows means in either said first direction or in said second direction.

6. A combination as defined in claim 1, in which said web has an opening passing through the upper flanges and including a conduit disposed in the opening for connecting the bellows means to the nozzle means.

* * * * *